(12) United States Patent
Ohta et al.

(10) Patent No.: US 6,417,977 B1
(45) Date of Patent: Jul. 9, 2002

(54) SYSTEM FOR TESTING AND CLEANING A REMOVABLE MEDIA DRIVE

(75) Inventors: Seiya Ohta, New Castle, WA (US); Leslie G Christie, Jr., Greeley; Mark E Wanger, Ft Collins, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/642,129

(22) Filed: Aug. 18, 2000

(51) Int. Cl.[7] ............................................. G11B 27/36
(52) U.S. Cl. ................... 360/31; 360/130.33; 360/132; 324/212
(58) Field of Search ................................ 324/212, 210, 324/226; 369/71; 360/128, 130.31, 130.33, 132, 134, 53, 31

(56) References Cited

U.S. PATENT DOCUMENTS

| | | | |
|---|---|---|---|
| 4,506,309 A | 3/1985 | Joannou et al. | |
| 4,928,189 A | 5/1990 | Siddiq | |
| 5,930,089 A | 7/1999 | Anderson | |
| 5,936,816 A | 8/1999 | Bloomquist et al. | |
| 6,215,618 B1 | * 4/2001 | Anderson et al. | 360/128 |

* cited by examiner

Primary Examiner—Alan T. Faber

(57) ABSTRACT

A system for testing and cleaning a removable media drive such as a tape drive includes a utility cartridge and computer readable program code to initiate utility operations. The utility cartridge comprises computer readable magnetic storage media for performing testing operations thereon and non-magnetic cleaning media for cleaning the drive head. A method for testing and cleaning a removable media drive is also disclosed, as is a method for providing the system described herein.

22 Claims, 5 Drawing Sheets

SYSTEM FOR TESTING AND CLEANING A REMOVABLE MEDIA DRIVE

FIELD OF THE INVENTION

The present invention relates generally to testing and cleaning removable media drives and utility cartridges therefor, and more particularly to a utility cartridge used in association with computer readable program code to perform testing and cleaning operations on a removable media drive such as a tape drive.

BACKGROUND OF THE INVENTION

As the amount of information grows with advent of information technology, there is a greater need for businesses to backup information they generate and gain. Backing up data primarily involves duplicating computer files to facilitate recovering lost and/or damaged data and to store critical, yet less frequently used, data for future reference. For some businesses, data backup is a legally-required procedure. Therefore, it is critical that the integrity of the data stored on the backup media must be kept intact so that the recovered data is as good as the original.

Magnetic tape is a very commonly used type of removable media to backup data of file servers, database servers, workstations, and other critical information for businesses. Magnetic tape is used since it offers unparalleled cost-per-density ratio and an ever-growing storage capacity. Magnetic tape cartridges may be of the single-reel type, which comprises a single reel for supplying and taking up the tape, or the dual-reel type, which comprises two reels for supplying and taking up the tape. Examples of the single-reel type of tape cartridge include digital linear tape (DLT), linear tape open (LTO), and IBM 3480/3490 cartridges. Examples of the dual-reel type of tape cartridge include digital audio tape (DAT), 4 mm or 8 mm, and Sony AIT cartridges.

Because of the contact made between the media and drive head during the backup operation, there is a problem with wear and tear and contamination on both the media and the drive head. Thus, it is absolutely necessary to clean the drive head at predetermined intervals and to dispose of tape media after being used so many times. Nevertheless, many failures still occur during backup and restore operations which may be attributable to defective or damaged tape media or a dirty drive head. If drives were maintained properly to prevent such failure, it would be much easier to identify and solve problems that cause backup or restore failures.

Typically, when a backup or restore failure occurs at a customer site and a general diagnostics program determines that either a media cartridge or the drive is to blame, there is no simple way a customer or even a service technician can determine which is really the problem. In most cases, a service technician simply replaces the suspected drive at a replacement cost of thousands of dollars and sends it back to the manufacturer just to make sure the technician doesn't have to return to the customer's site. If the actual problem simply involved defective or damaged media or a dirty drive head, the repair could have been much more simple and cost considerably less.

Thus, it would be generally desirable to provide a customer with a system for testing and cleaning a removable media drive so that the customer can easily diagnose and possibly remedy problems involving defective or damaged tape media or a dirty drive head. Such a system would provide the customer with a guaranteed readable multi-purpose utility cartridge in combination with computer readable program code to initiate testing and cleaning operations. The utility cartridge would preferably include both computer readable magnetic storage media and non-magnetic cleaning media. In addition, it would be most preferable if this system tested more than simply the functions of the drive head.

While the present invention is specifically adapted for use with a tape drive of the type which utilize tape cartridges, it is to be understood that the testing and cleaning system described herein may be adapted for use with other types of removable media drives such as, for example, CD read/write drives, DVD read/write drives, or removable hard drives.

SUMMARY OF THE INVENTION

The present invention is directed to a system for testing and cleaning a removable media drive. The system may comprise a utility cartridge adapted for use by the removable media drive which includes computer readable magnetic storage media attached to non-magnetic cleaning media which is adapted to clean the drive head(s). The system may also comprise a computer usable medium (which may be firmware embodied within the removable media drive) having computer readable program code embodied therein for performing utility operations on the removable media drive using the utility cartridge. Code may be included for initiating a testing operation on the removable media drive utilizing the computer readable magnetic storage media. Code may also be included for initiating a cleaning operation on the drive head utilizing the non-magnetic cleaning media. The utility cartridge may comprise a housing which has either one or two reels for supplying and taking up the media. The computer readable magnetic storage media may comprise a first section for performing a write/read/compare operation thereon, a second section for performing a written data standards operation thereon, and third and fourth sections for performing these operations subsequent to a cleaning operation.

Accordingly, the code for initiating a testing operation may include code for initiating the write/read/compare operation as well as code for initiating the written data standards operation. The write/read/compare operation involves writing a first set of test data by the removable media drive on either the first section or the third section of storage media, thereby creating a first set of written data. Then, the first set of written data is read by the removable media drive and compared with the first set of test data. The written data standards operation involves reading a first set of standards data on either the second section or the fourth section of storage media, thereby creating a first set of read data. The first set of standards data is representative of varying levels (e.g., upper and lower limits) of written is data standards for the removable media drive. Then, the first set of read data is compared with written data standards on the computer usable medium.

The removable media drive may comprise a cartridge memory reader. Thus, the utility cartridge may comprise a computer readable device having predetermined cartridge information embedded therein which is adapted to test the operation of the cartridge memory reader. The computer readable device may also be adapted to test the integrity of the connection between the cartridge memory reader and a processor utilizing the computer usable medium. Accordingly, the code for initiating a testing operation may include code for performing a cartridge memory reader operation, which involves reading of said computer readable device by said cartridge memory reader.

The present invention is also directed to a method for testing and cleaning a removable media drive. The method comprises the initial step of inserting a utility cartridge into the removable media drive. At any time subsequent to the initial step, a testing operation may be initiated on the removable media drive using the computer readable magnetic storage media, and a cleaning operation may be initiated on the drive head using the non-magnetic cleaning media. After the cleaning operation is performed, a testing operation may be re-initiated on the removable media drive.

The present invention is also directed to a method for providing a system for testing and cleaning a removable media drive. This method comprises providing a utility cartridge having computer readable magnetic storage media and non-magnetic cleaning media therein. The next step of the method involves providing access to a computer usable medium having computer readable program code embodied therein for performing utility operations on the removable media drive using the utility cartridge. The utility operations comprise at least one testing operation and at least one cleaning operation.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
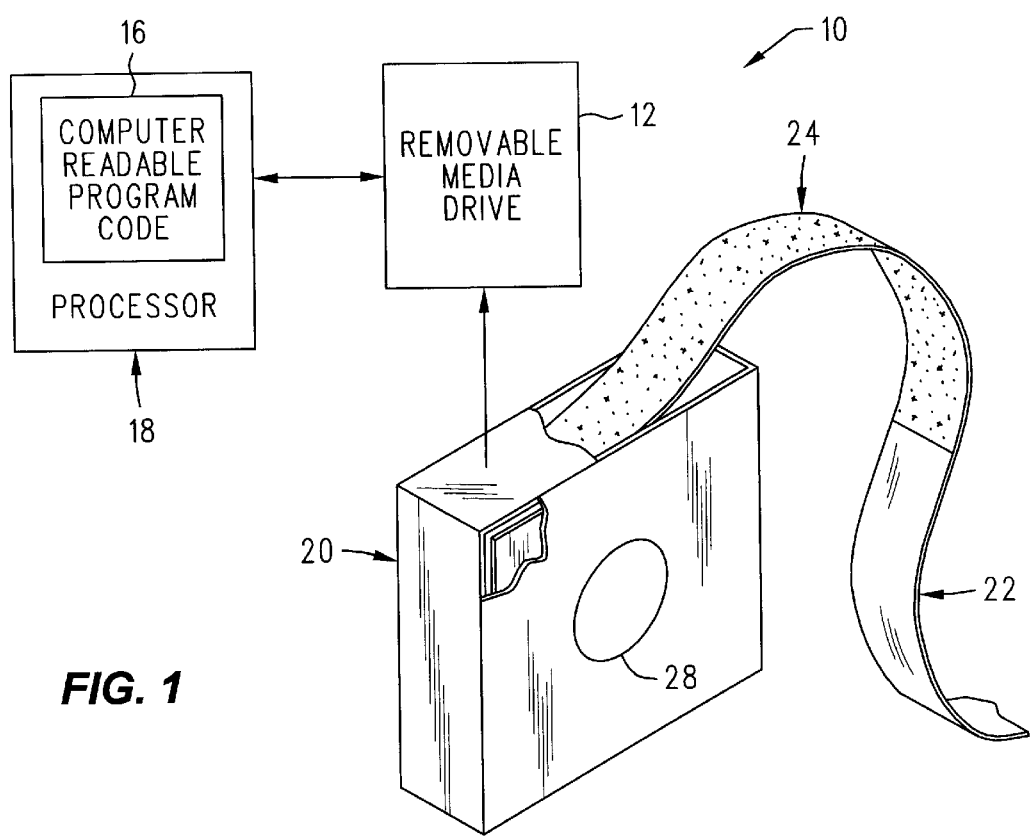
FIG. 1 is a schematic illustration of the system for testing and cleaning a removable media drive of the present invention utilizing a single-reel utility cartridge.
Figure 2:
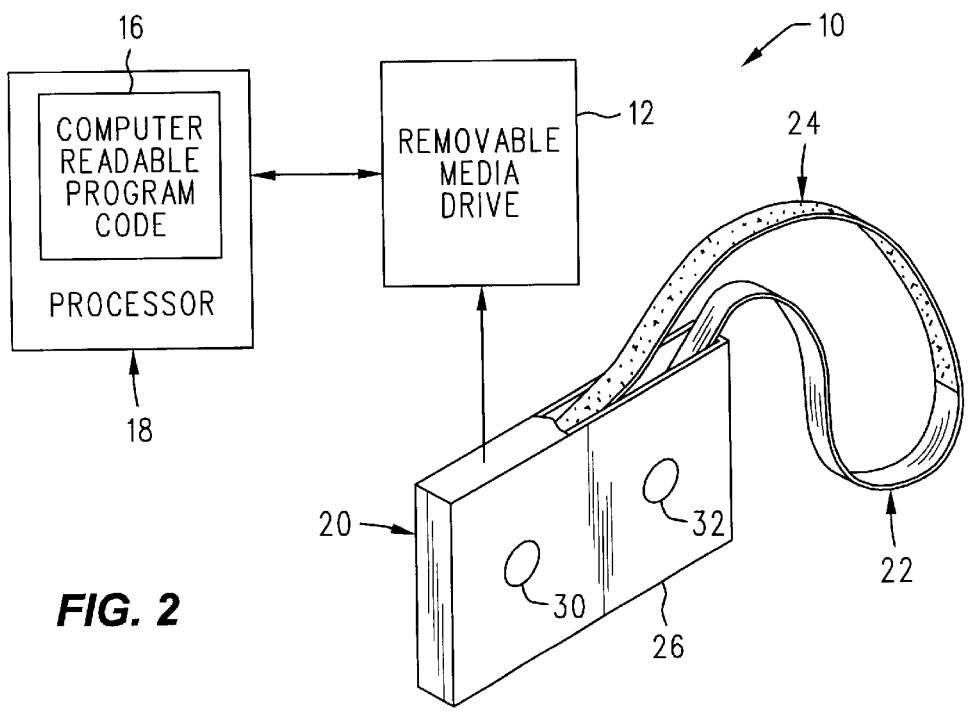
FIG. 2 is a schematic illustration of the system of FIG. 1 utilizing a dual-reel utility cartridge.
Figure 3:
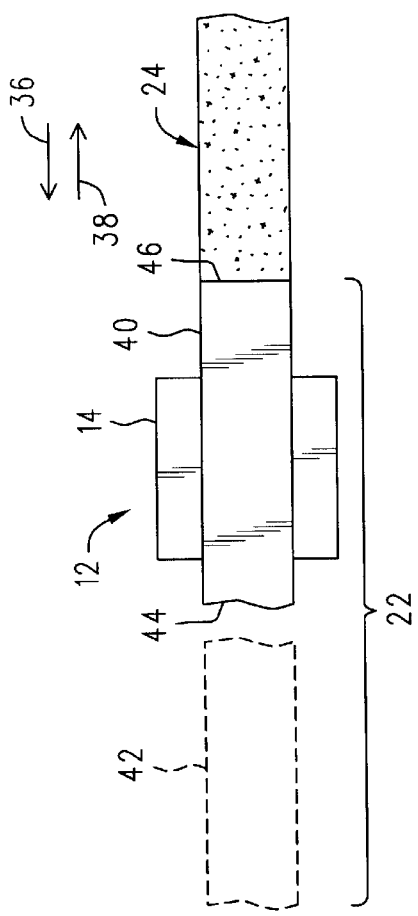
FIG. 3 is a schematic illustration of the media from the utility cartridge of FIGS. 1 and 2 and a drive head.
Figure 4:
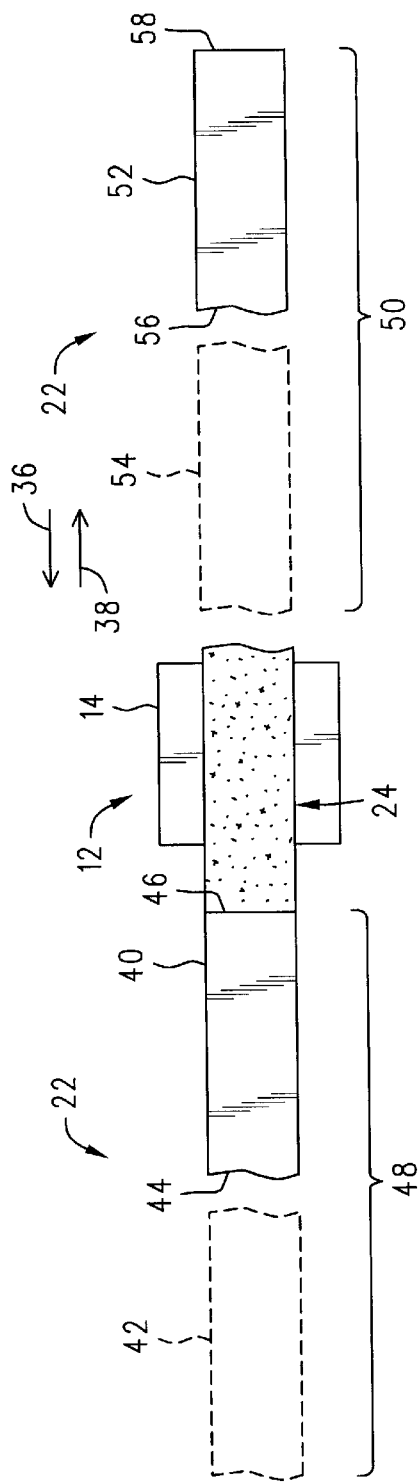
FIG. 4 is a schematic illustration showing another embodiment of the media of FIG. 3.

FIGS. 1 and 2 schematically illustrate a system 10 for testing and cleaning a removable media drive 12. The system 10 comprises a utility cartridge 20 which is adapted for use by the removable media drive 12. The utility cartridge 20 comprises computer readable magnetic storage media 22, which may be any type of magnetic storage removable media known in the art that is adapted to be read and written on by a drive head 14 (FIGS. 3–4). The utility cartridge 20 further comprises non-magnetic cleaning media 24 attached to, or spliced with, the computer readable magnetic storage media 22. The non-magnetic cleaning media 24 may be any type of cleaning removable media known in the art which is adapted to clean a drive head 14 (FIGS. 3–4). For example, the cleaning removable media may be of the type used in a DLT cleaning cartridge manufactured by Quantum Corp. in Threwsbury, Mass. The media 22, 24 is adapted to perform various utility operations (i.e., testing and cleaning operations) on the removable media drive 12 as described below.

The system 10 shown in FIGS. 1 and 2 preferably comprises a computer usable medium 16 having computer readable program code embodied therein for performing utility operations on the removable media drive 12. The computer usable medium 16 may be anything capable of storing computer readable program code. For example, the computer usable medium 16 may be comprised of firmware (not shown) embodied within the removable media drive 12. Such firmware may be comprised of, for example, a microprocessor 18 which is adapted to store computer readable program code and use such code to send instructions to the removable media drive 12. Alternatively, the computer usable medium 16 may be located remotely from the removable media drive 12. For example, the computer usable medium 16 may be comprised of one or more "hard" disks on a personal computer or network server, CD ROM's, or "floppy" disks adapted to store computer readable program code which may be utilized by a processor 18 in order to send instructions to the removable media drive 12. As used hereinafter, the term "processor" includes a microprocessor, as well. Practically speaking, accessibility of the computer readable program code may be provided in several different manners. For example, the code may be stored on a computer and/or disks at a customer's site, or it may be accessible from a remote server over the Internet or an intranet. A service technician may utilize a portable computer and/or disks containing the computer readable program code.

The utility cartridge 20 comprises a housing 26, the shape and size of which depending on the type of removable media drive 12 which is in need of maintenance. FIG. 1 illustrates a utility cartridge 20 such as a DLT, LTO, or IBM cartridge which comprises a single reel 28 for supplying and taking up the media 22, 24. The media 22, 24 in such single-reel cartridges 20 generally comprise a leader portion (not shown) which is grasped or otherwise taken up by the removable media drive 12 in order to thread the media 22, 24 onto the drive 12. The type of leader portion used in the utility cartridge 20 may depend on the type of cartridge (e.g., DLT, LTO or IBM) used, and may be any media leader portion which is presently used in such types of cartridges. FIG. 2 illustrates a utility cartridge 20 such as a DAT, 4 mm, 8 mm, or AIT cartridge which comprises dual reels 30, 32 for supplying and taking up the media 22, 24. Such media 22, 24 is typically fixedly attached to each of the reels 30, 32 to form a continuous supply of media (i.e., without a leader portion) which may be supplied from or taken up by the dual reels 30, 32 as necessary.

It can be seen from the above that a utility cartridge may be created in accordance with the present invention for any type of removable media drive, including those presently known or those yet to be designed, so long as the removable media drive uses media 22, 24 such as that described herein. In other words, the media 22, 24 of the present invention may be adapted for use with any type of cartridge housing comprising any number of reels, etc. The DLT/LTO/IBM cartridge 20 shown in FIG. 1 and DAT/4 mm/8 mm/AIT cartridge 20 shown in FIG. 2 are for exemplary purposes only.

The removable media drive 12 may comprise a cartridge memory reader (not shown) which is adapted to read a computer readable device 34, FIG. 1, having predetermined cartridge information embedded therein.

Cartridge memory readers may be found in, for example, removable media drives adapted to be used with LTO cartridges. The computer readable device 34 may include one or more microprocessors (not shown) therein and may be mounted inside the cartridge housing 26 as shown in FIG. 1. The computer readable device 34 may be adapted to perform a "cartridge memory reader" operation, which tests the ability of the cartridge memory reader to read the computer readable device 34. This operation 94 also tests the integrity of the connection between the cartridge memory reader and a processor 18 utilizing the computer usable medium 16, since if there was a problem with the connection, the processor 18 would not be able to receive and process the information read by the cartridge memory reader. Examples of cartridge information which may be included on the computer readable device 34 include, but is not limited to, the serial number and format of the utility cartridge 20, calibration information, length of the media 22, 24 in the utility cartridge 20, amount and format of data written on the storage media 22, the date of manufacture of the utility cartridge 20, is the number of times the utility cartridge 20 has been used, and a record of any errors previously encountered in using the utility cartridge 20.

FIGS. 3 and 4 schematically illustrate the media 22, 24 advancing in a forward linear direction 36 and passing across a head 14 on a removable media drive 12. As shown in FIG. 3, the computer readable magnetic storage media 22 may comprise a first section 40 which is utilized during a "write/read/compare" operation. During the "write" portion of this operation, the drive head 14 writes a first set of test data (located on a computer usable medium 16 which is described in further detail below) on the first section 40 of storage media 22, thereby creating a first set of written data. The media 22 is then rewound in a reverse linear direction 38 to the beginning 44 of the first section 40 in preparation for the "read" portion of the operation whereby the first set of written data is read by the drive head 14. The first set of written data is then compared to the first set of test data in the "compare" portion of the operation. The first section 40 may initially be comprised of blank magnetic removable media, or it may contain data from previous write/read/ compare operations which the removable media drive 12 may erase prior to or during a new write/read/compare operation. For example, an erase head (not shown) may be positioned adjacent to or in the vicinity of the drive head 14, whereby the removable media in the first section 40 may be drawn across the erase head just prior to passing by the drive head 14 during the "write" portion of the write/read/compare operation described above.

The computer readable magnetic storage media 22 may further comprise a second section 42 which may be positioned next to the first section 40 adjacent to either side 44, 46 thereof (i.e., adjacent and prior to the first section 40 as shown in FIG. 3, or between the first section 40 and the cleaning media 24). The second section 42, which is an optional section as indicated in dashed lines, may contain a first set of standards data which is representative of varying levels of written data standards, for example at the upper and lower limits thereof, within each category of written data standards. This data is utilized in a "written data standards" operation which is performed in order to evaluate whether the drive head 14 can recognize the data. Examples of the categories of written data standards include azimuth, jitter margin, head cross-talk, track placement variation, level of magnetic saturation, bit density variation, and data error recovery. These written data standards are known in the art and are described in U.S. Pat. No. 4,506,309. During the written data standards operation, the first set of standards data is read by the drive head 14 under test, thereby creating a first set of read data. The first set of read data is then compared with written data standards which may be located on a computer usable medium 16 described in further detail below.

As shown in FIG. 3, the non-magnetic cleaning media 24 is preferably positioned adjacent to (i.e., it is spliced with) computer readable magnetic storage media 22 in order to perform a cleaning operation on the drive head 14 subsequent to and/or prior to performing the testing operations described above. The cleaning media 24 may be positioned adjacent to the first portion 42 of the storage media 22 (on either side 44, 46 thereof) as shown in FIG. 3, or it may alternately be positioned adjacent to the second portion 42. The relative position of the cleaning media 24 is not critical to the present invention. However, since the cleaning media 24 may be considerably longer than the storage media 22, it may be most practical to position the cleaning media 24 subsequent to the storage media 22 so that the entire length of cleaning media 24 need not be passed by the drive head 14 in order to access the storage media 22. For example, the ratio of the length of the cleaning media 24 to the length of the storage media 22 may be 50:1. Providing a relatively long cleaning media 24 allows different portions of the cleaning media 24 to be used during subsequent cleaning operations of the drive head 14, thereby lengthening the useful life of the cleaning media 24 and of the utility cartridge 20 (FIGS. 1 and 2).

In an alternative embodiment shown in FIG. 4, the non-magnetic cleaning media 24 may be positioned between separate portions 48, 50 of computer readable magnetic storage media 22. The first portion 48 of storage media 22 may comprise a first section 40 and an optional second section 42 (both of which are described above). The first portion 48 of storage media 24 is positioned so that it passes across the drive head 14 prior to the cleaning media 24. The second portion 50 of storage media 24 may comprise a third section 52 which may be substantially identical to the first section 40 and an optional fourth section 54 which may be substantially identical to the second section 42. As with the first and second sections 40, 42, the fourth section 54 may be positioned adjacent either side 56, 58 of the third section 52. The second portion 48 of storage media 22 is positioned so that it passes across the drive head 14 subsequent to the cleaning media 24. In the embodiment of FIG. 4, a write/ read/compare operation (and optionally a written data standards operation) may be performed prior to cleaning the drive head 14. After the cleaning operation, further testing operations may take place without the need to rewind the media 22, 24 in direction 36. In this embodiment, the cleaning media 24 would necessarily be relatively shorter in length than the cleaning media 24 of the embodiment of FIG. 3.

Figure 5:
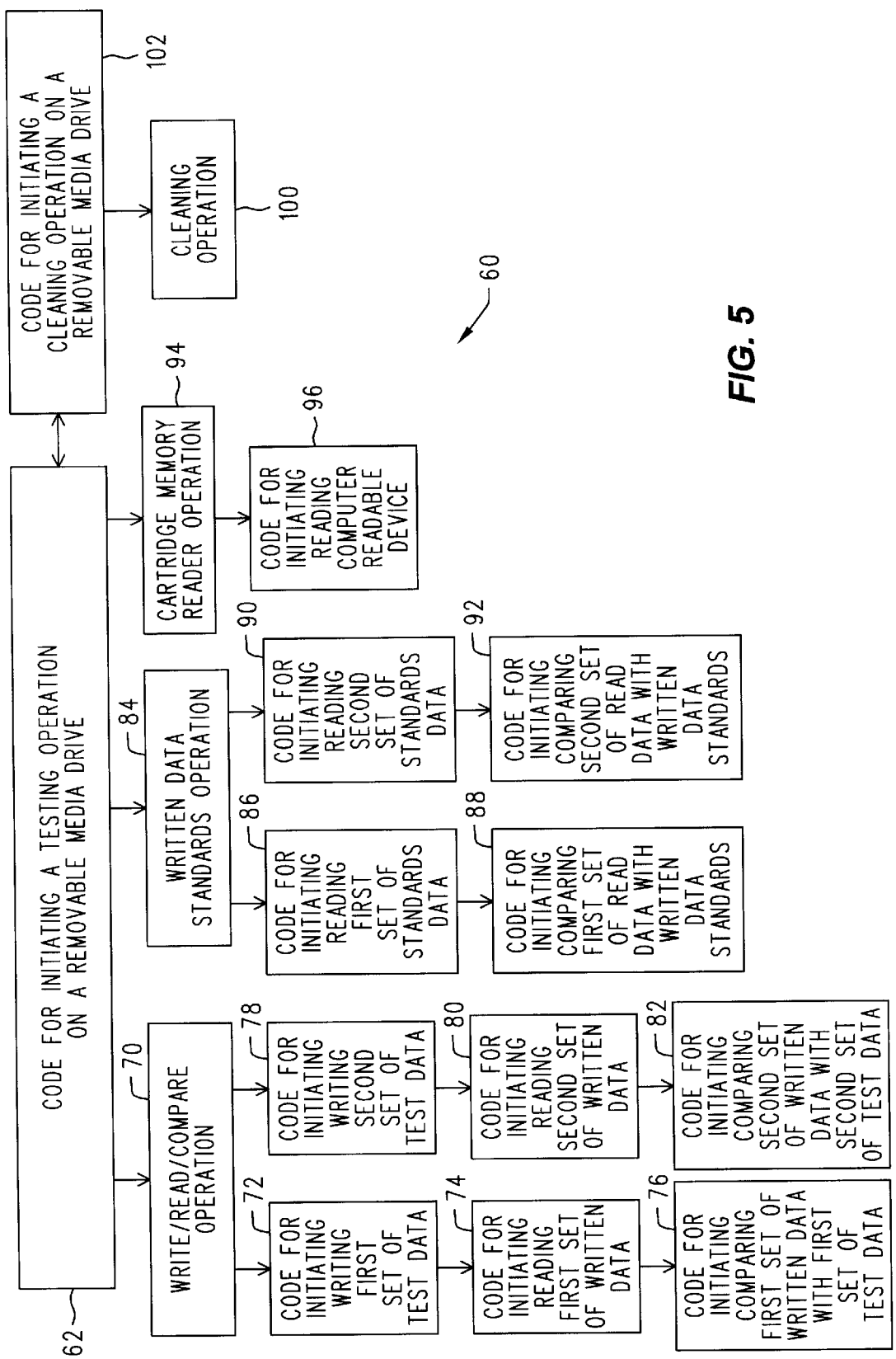
FIG. 5 is a flow chart illustrating computer readable program code for performing utility operations on a removable media drive using the utility cartridge of the present invention.

As illustrated in FIG. 5 and with reference to FIGS. 1–4, the computer readable program code 60 may comprise code 62 for initiating a testing operation on the removable media drive 12 utilizing the computer readable magnetic storage media 22. An example of a testing operation which may be performed is the write/read/compare operation 70 described above. As shown in FIG. 5, to perform the write/read/ compare operation 70, code 72 may be provided for initiating writing of a first set of test data by the removable media drive 12 on the computer readable magnetic storage media 22, thereby creating a first set of written data thereon. The first set of test data may be located on the computer usable medium 16 described above. Code 74 may also be provided for initiating reading of the first set of written data by the removable media drive 12. Code 76 may also be provided for initiating comparing of the first set of written data with the first set of test data. If these two sets of data do not exactly match, then the write/read/compare operation 70 may conclude that either the read function or the write function, or both, of the drive head 14 may be faulty.

With reference to the embodiment of FIG. 4, the write/ read/compare operation 70 may be re-initiated subsequent to the cleaning operation 100 (described below). Thus, the computer readable program code 60 may further comprise code 78 for initiating writing of a second set of test data by the removable media drive 12 on the computer readable magnetic storage media 22, thereby creating a second set of written data thereon. The second set of test data may be located on the computer usable medium 16 described above, and may be identical to the first set of test data. Code 80 may also be provided for initiating reading of the second set of written data by the removable media drive 12. Code 82 may also be provided for initiating comparing of the second set of written data with the second set of test data. If these two sets of data do not exactly match, then the write/read/compare operation 70 may conclude that the cleaning operation 100 did not solve the problem, and that either the read function or the write function, or both, of the drive head 14 may be faulty.

Another testing operation which may be performed is the written data standards operation 84 described above. As shown in FIG. 5, to perform the written data standards operation 84, code 86 may be provided for initiating reading of a first set of standards data which is representative of varying levels (e.g., upper and lower limits) of written data standards for the removable media drive, as described above. This creates a first set of read data. Code 88 may also be provided for initiating comparing of the first set of read data with written data standards which may be located on the computer usable medium 16. With reference to the embodiment of FIG. 4, the written data standards operation 84 may be re-initiated subsequent to the cleaning operation 100 (described below). Thus, the computer readable program code 60 may further comprise code 90 for initiating reading of a second set of standards data which is representative of varying levels (e.g., upper and lower limits) of written data standards for the removable media drive, which may be identical to the first set of standards data described above. This creates a second set of read data. Code 92 may also be provided for initiating comparing of the second set of read data with written data standards which may be located on the computer usable medium 16. If these two sets of data do not exactly match, then the written data standards operation 84 may conclude that the cleaning operation 100 did not solve the problem, and that either the read function or the write function, or both, of the drive head 14 may be faulty.

Another testing operation which may be performed is the cartridge memory reader operation 94. As noted above, the cartridge memory reader a operation 94 tests the ability of the cartridge memory reader in the removable media drive 12 to read the computer readable device 34, as well as the integrity of the connection between the cartridge memory reader (not shown) and a processor 18 utilizing the computer usable medium 16. The cartridge memory reader operation 94 may comprise code 96 for initiating reading of the computer readable device 34.

It should be noted that, while two of the testing operations (namely, the write/read/compare operation 70 and written data standards operation 84) described above are adapted to test the read/write functions of the removable media drive, the cartridge memory reader operation 94 is adapted to test a function other than the read/write functions of the removable media drive. In other words, the utility cartridge 20 and system 10 associated therewith may be adapted to do more than simply test and clean the drive head 14. In addition, code (not shown) may be provided for testing the ability of the removable media drive to sense the presence of the utility cartridge, as well as the ability of the removable media drive to thread the media 22, 24 across the drive head 14.

A cleaning operation 100 may be performed on the drive head 14 utilizing the non-magnetic cleaning media. To perform the cleaning operation 100, the computer readable program code 60 may further comprise code 102 for initiating cleaning of the head 14 of the removable media drive 12 utilizing the non-magnetic cleaning media 24. Such code 102 may include of an instruction to advance the media 22 until a desired portion of the cleaning media 24 is reached. The code 102 may further include an instruction to advance the cleaning media 24 in a forward linear direction 36 with the drive head 14 engaged therewith until a predetermined portion of the cleaning media 24 has been drawn across the drive head 14. As discussed above, it may desirable to use different portions of the cleaning media 24 in subsequent cleaning operations, and appropriate instructions therefor may be included in the code 102.

Figure 6:
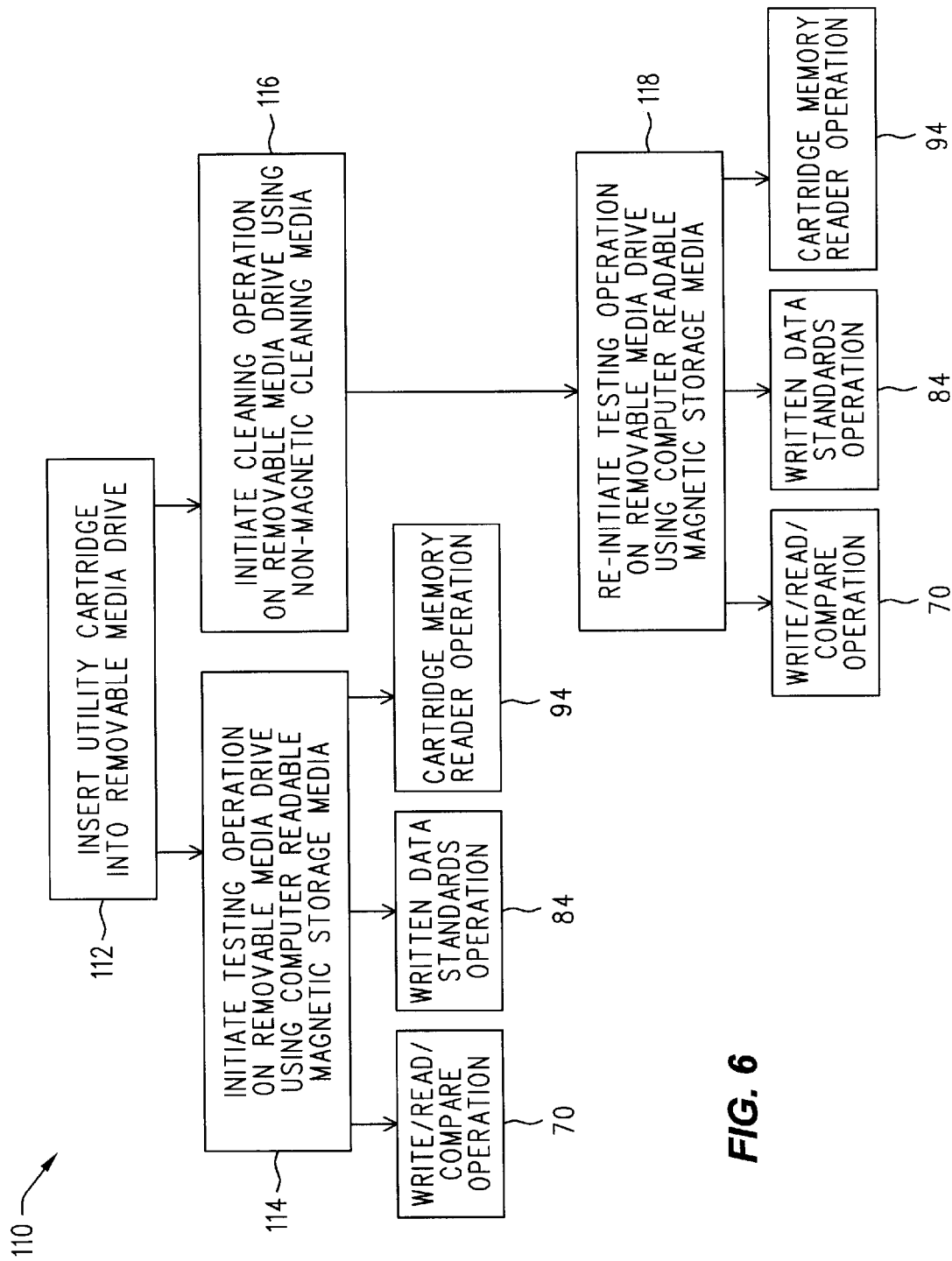
FIG. 6 is a flow chart illustrating a method for testing and cleaning a removable media drive.

FIG. 6 illustrates a method 110 for testing and cleaning a removable media drive 12 (FIGS. 1–4) comprising at least one drive head 14 (FIGS. 3–4).

With reference also to FIGS. 1–5, the method 110 may comprise the initial step 112 of inserting a utility cartridge 20 as described above into the removable media drive 12. At any time subsequent to the initial step, a step 114 may be performed which comprises initiating a testing operation on the removable media drive 12 using the computer readable magnetic storage media 22 described above. At any time subsequent to the initial step 112, a step 116 may be performed which comprises initiating a cleaning operation 100 on the drive head 14 using the non-magnetic cleaning media 24 described above.

As shown in FIG. 6, the testing operation may be any testing operation described above, such as the write/read/compare operation 70, the written data standards operation 84, and/or the cartridge memory reader operation 94. Specifically, the step 114 of initiating a testing operation on the removable media drive 12 may comprise utilizing the removable media drive 12 to write a first set of test data on the computer readable magnetic storage media 22, thereby creating a first set of written data. The step 114 may further comprise utilizing the removable media drive 12 to read the first set of written data, and then comparing the first set of written data with the first set of test data. The step 114 may also comprise utilizing the removable media drive to read a first set of standards data which is representative to varying levels (e.g., upper and lower limits) of written data standards for the removable media drive 12, and then comparing the first set of read data with the first set of standards data.

The method 110 shown in FIG. 6 may further comprise the step 118 of re-initiating a testing operation on the removable media drive 12 using the computer readable magnetic storage media 22 subsequent to the step 116 of initiating a cleaning operation on the drive head 14. Any of the testing operations described above and shown in FIG. 6 may be performed.

Figure 7:
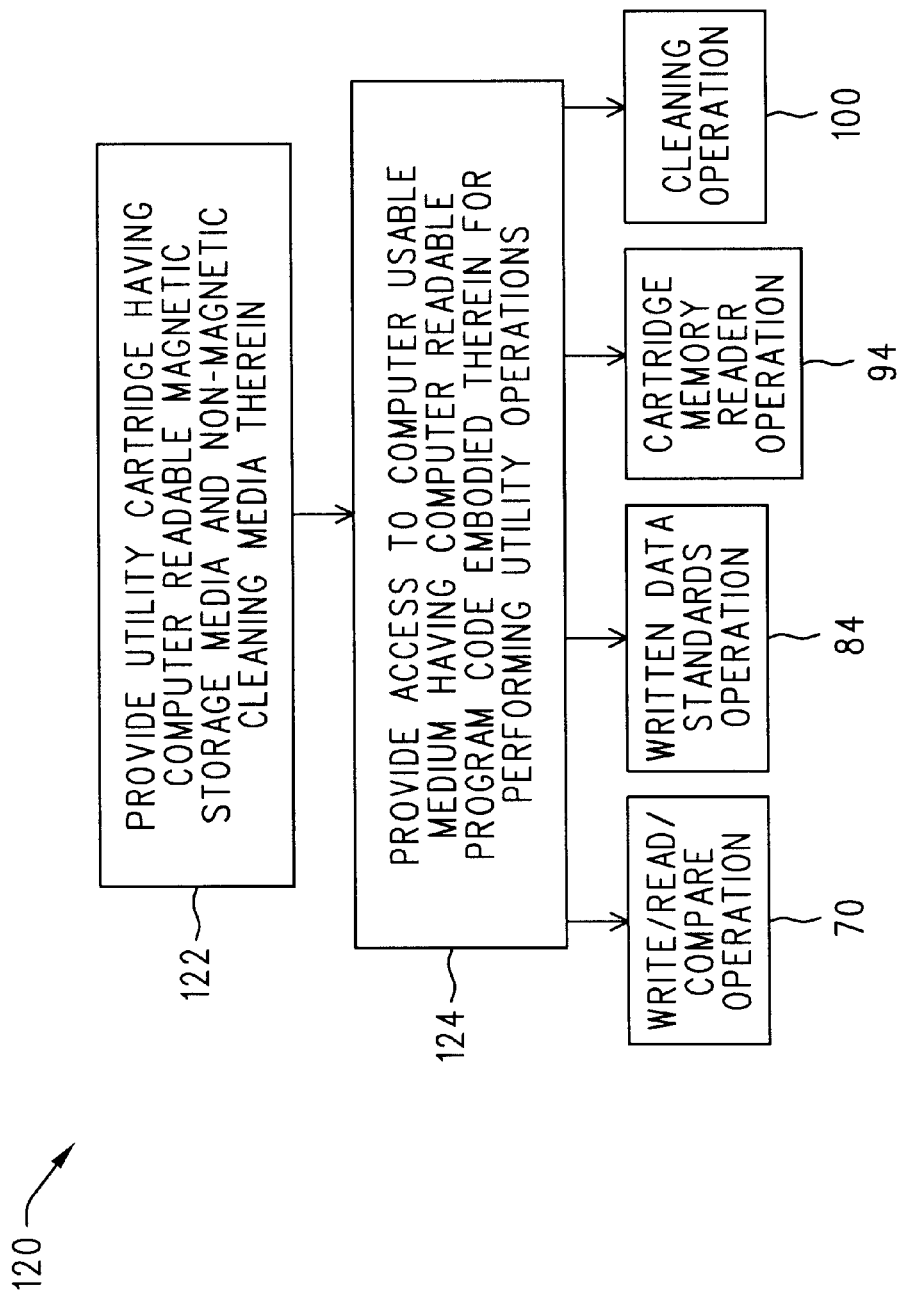
FIG. 7 is a flow chart illustrating a method for providing a system for testing and cleaning a removable media drive.

FIG. 7 illustrates a method 120 for providing a system 10 (FIGS. 1–2) for testing and cleaning a removable media drive 12 (FIGS. 1–4) comprising at least one drive head 14 (FIGS. 3–4). With reference also to FIGS. 1–5, the method 120 may comprise the step 122 of providing a utility cartridge 20 having computer readable magnetic storage media 22 and non-magnetic cleaning media 24 therein. The next step 124 of the method 120 comprises providing access to a computer usable medium 16 having computer readable program code embodied therein for performing utility operations on the removable media drive 12 using the utility cartridge 20. As discussed above, such access may be provided via the Internet or an intranet, floppy or hard disk(s), CD-ROM's, independent software vendor (ISV) application, or the like. As shown in FIG. 7, the utility operations may include the write/read/compare operation 70, the written data standards operation 84, the cartridge memory reader operation 94, and the cleaning operation 100.

It can be seen from the above that the utility cartridge of the present invention not only performs maintenance operations on a removable media drive. The utility cartridge also provides a customer with a guaranteed readable removable media which may be used as a standard against other removable medias that the customer may utilize. Using the utility cartridge of the present invention, the customer can easily diagnose and possibly remedy problems involving defective or damaged removable media or a dirty drive head.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:

1. A system for testing and cleaning a removable media drive comprising at least one drive head, comprising:
   a) a utility cartridge adapted for use by said removable media drive comprising:
      i) computer readable magnetic storage media; and
      ii) non-magnetic cleaning media attached to said computer readable magnetic storage media which is adapted to clean said drive head; and
   b) computer usable medium having computer readable program code embodied therein for performing utility operations on said removable media drive using said utility cartridge, comprising:
      i) code for initiating a testing operation on said removable media drive utilizing said computer readable magnetic storage media; and
      ii) code for initiating a cleaning operation on said drive head utilizing said non-magnetic cleaning media.

2. The system of claim 1 wherein:
   a) said computer readable magnetic storage media comprises a first section for performing a write/read/compare operation thereon; and
   b) said code for initiating a testing operation on said removable media drive comprises code for initiating said write/read/compare operation, comprising:
      code for initiating writing of a first set of test data by said removable media drive on said first section, thereby creating a first set of written data;
      ii) code for initiating reading of said first set of written data by said removable media drive; and
      iii) code for initiating comparing of said first set of written data with said first set of test data.

3. The system of claim 2 wherein:
   a) said computer readable magnetic storage media further comprises a second section for performing a written data standards operation thereon; and
   b) said code for initiating a testing operation on said removable media drive comprises:
      i) code for initiating reading of a first set of standards data on said second section, said first set of standards data being representative of varying levels of written data standards for said removable media drive, thereby creating a first set of read data; and
      ii) code for initiating comparing of said first set of read data with written data standards on said computer usable medium.

4. The system of claim 2 wherein said first set of standards data comprises upper and lower limits of said written data standards.

5. The system of claim 2 wherein:
   a) said computer readable magnetic storage media further comprises a third section for performing a write/read/compare operation thereon, whereby said non-magnetic cleaning media is positioned between said first section and said third section; and
   b) said code for initiating a testing operation on said removable media drive further comprises:
      i) code for initiating writing of a second set of test data by said removable media drive on said third section, thereby creating a second set of written data;
      ii) code for initiating reading of said second set of written data by said removable media drive; and
      iii) code for initiating comparing of said second set of written data with said second set of test data.

6. The system of claim 5 wherein:
   a) said computer readable magnetic storage media further comprises a fourth section for performing a written data standards operation thereon; and
   b) said code for initiating a testing operation on said removable media drive comprises:
      i) code for initiating reading of a second set of standards data on said fourth section, said second set of standards data being representative of varying levels of written data standards for said removable media drive, thereby creating a second set of read data; and
      ii) code for initiating comparing of said second set of read data with written data standards on said computer usable medium.

7. The system of claim 6 wherein said second set of standards data comprises upper and lower limits of said written data standards.

8. The system of claim 1 wherein said computer usable medium is comprised of firmware embodied within said removable media drive.

9. The system of claim 1 wherein said computer usable medium is located remotely from said removable media drive.

10. The system of claim 1 wherein said removable media drive further comprises a cartridge memory reader, and wherein:
    a) said utility cartridge further comprises a computer readable device having predetermined cartridge information embedded therein which is adapted to test the operation of said cartridge memory reader and the integrity of the connection between said cartridge memory reader and a processor utilizing said computer usable medium; and
    b) said code for initiating a testing operation on said removable media drive comprises code for initiating reading of said computer readable device.

11. A method for providing a system for testing and cleaning a removable media drive comprising at least one drive head, comprising the steps of:
    a) providing a utility cartridge having computer readable magnetic storage media and non-magnetic cleaning media therein; and
    b) providing access to a computer usable medium having computer readable program code embodied therein for performing utility operations on said removable media drive using said utility cartridge, said utility operations comprising at least one testing operation and at least one cleaning operation.

12. A system for testing and cleaning a removable media drive comprising at least one drive head, comprising:
   a) a utility cartridge means for performing at least one testing operation and at least one cleaning operation on said removable media drive, said utility cartridge means comprising:
      i) computer readable magnetic storage media means for performing said testing operation; and
      ii) non-magnetic cleaning media means for performing said cleaning operation;
   b) computer readable program means for initiating said testing operation and said cleaning operation.

13. A utility cartridge for testing and cleaning a removable media drive comprising at least one drive head, comprising:
   a) a cartridge housing;
   b) computer readable magnetic storage media stored within said cartridge housing for performing testing operations thereon and which is adapted to be written on by said drive head; and
   c) non-magnetic cleaning media which is adapted to clean said drive head, whereby said non-magnetic cleaning media is attached to and positioned between a first section and a second section of said computer readable magnetic storage media.

14. The utility cartridge of claim 13 wherein said removable media drive further comprises a cartridge memory reader and said utility cartridge further comprises a computer readable device having predetermined cartridge information embedded therein which is adapted to test the operation of said cartridge memory reader.

15. A utility cartridge for testing and cleaning a removable media drive comprising at least one drive head, comprising:
   a) a cartridge housing;
   b) computer readable magnetic storage media stored within said cartridge housing for performing testing operations thereon and which is adapted to be written on by said drive head; and
   c) non-magnetic cleaning media attached to said computer readable magnetic storage media and stored within said cartridge housing which is adapted to clean said drive head, whereby said non-magnetic cleaning media is positioned between a section of said computer readable magnetic storage media for performing a written data standards operation thereon and a section of said computer readable magnetic storage media for performing a write/read/compare operation thereon.

16. The utility cartridge of claim 15, said computer readable magnetic storage media comprising a first section for performing a first write/read/compare operation thereon, a second section for performing a first written data standards operation thereon, a third section for performing a second write/read/compare operation thereon, and a fourth section for performing a second written data standards operation thereon, wherein said non-magnetic cleaning media is positioned between said second section and said third section of said computer readable magnetic storage media.

17. The utility cartridge of claim 15 wherein said removable media drive further comprises a cartridge memory reader and said utility cartridge further comprises a computer readable device having predetermined cartridge information embedded therein which is adapted to test the operation of said cartridge memory reader.

18. A method for testing and cleaning a removable media drive comprising at least one drive head, comprising the steps of:
   a) inserting a utility cartridge into said removable media drive, said utility cartridge comprising computer readable magnetic storage media and non-magnetic cleaning media which is adapted to clean said drive head;
   b) initiating at least one testing operation on said removable media drive using at least a first section of said computer readable magnetic storage media;
   c) advancing said computer readable magnetic storage media in a forward linear direction such that said non-magnetic cleaning media is adjacent to said drive head;
   d) initiating a cleaning operation on said drive head using said non-magnetic cleaning media;
   e) advancing said non-magnetic cleaning media in a forward linear direction such that at least a second section of said computer readable magnetic storage media is adjacent to said drive head; and
   f) re-initiating a testing operation on said removable media drive using said second section of said computer readable magnetic storage media.

19. The method of claim 18 wherein said removable media drive further comprises a cartridge memory reader, the method further comprising:
   utilizing said cartridge memory reader to read a computer readable device in said utility cartridge having predetermined cartridge information embedded therein in order to test the operation of said cartridge memory reader.

20. A method for testing and cleaning a removable media drive comprising at least one drive head, comprising the steps of:
   a) inserting a utility cartridge into said removable media drive, said utility cartridge comprising computer readable magnetic storage media and non-magnetic cleaning media which is adapted to clean said drive head;
   b) in response to instructions from a computer usable medium, initiating a first testing operation on said removable media drive using a first section of said computer readable magnetic storage media, said first testing operation being a write/read/compare operation;
   c) either prior or subsequent to said initiating a first testing operation, in response to instructions from said computer usable medium, initiating a second testing operation on said removable media drive using a second section of said computer readable magnetic storage media, said second testing operation being a written data standards operation;
   d) advancing said computer readable magnetic storage media in a forward linear direction such that said non-magnetic cleaning media is adjacent to said drive head; and
   e) in response to instructions from said computer usable medium, initiating at least one cleaning operation on said drive head using said non-magnetic cleaning media.

21. The method of claim 20 wherein said removable media drive further comprises a cartridge memory reader, the method further comprising:
   utilizing said cartridge memory reader to read a computer readable device in said utility cartridge having predetermined cartridge information embedded therein in order to test the operation of said cartridge memory reader.

22. The method of claim 20, further comprising, subsequent to said initiating at least one cleaning operation: in response to instructions from said computer usable medium, re-initiating at least one testing operation on said removable media drive using at least a third section of said computer readable magnetic storage media.

* * * * *